(12) United States Patent
McCartney

(10) Patent No.: US 9,766,754 B2
(45) Date of Patent: Sep. 19, 2017

(54) OPTICAL SENSING ARRAY EMBEDDED IN A DISPLAY AND METHOD FOR OPERATING THE ARRAY

(71) Applicant: SAMSUNG DISPLAY CO., LTD., Yongin, Gyeonggi-Do (KR)

(72) Inventor: Richard I. McCartney, Scotts Valley, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/469,471

(22) Filed: Aug. 26, 2014

(65) Prior Publication Data
US 2015/0061977 A1    Mar. 5, 2015

Related U.S. Application Data

(60) Provisional application No. 61/870,746, filed on Aug. 27, 2013.

(51) Int. Cl.
| | |
|---|---|
| *G06F 3/042* | (2006.01) |
| *G09G 3/20* | (2006.01) |
| *G06F 3/041* | (2006.01) |
| *G02F 1/1333* | (2006.01) |

(52) U.S. Cl.
CPC .......... *G06F 3/042* (2013.01); *G02F 1/13338* (2013.01); *G06F 3/0412* (2013.01); *G09G 3/20* (2013.01); *G09G 2320/0295* (2013.01); *Y10T 29/49117* (2015.01)

(58) Field of Classification Search
CPC ...... G09G 3/2092; G09G 3/36; G09G 3/3208; G09F 3/042
See application file for complete search history.

(56) References Cited

U.S. PATENT DOCUMENTS

| | | | | |
|---|---|---|---|---|
| 7,894,022 | B2* | 2/2011 | Kim | G01J 3/51 345/102 |
| 2005/0140285 | A1* | 6/2005 | Park | H01L 27/3246 313/506 |
| 2005/0161740 | A1* | 7/2005 | Park | H01L 27/3253 257/347 |

(Continued)

FOREIGN PATENT DOCUMENTS

| | | |
|---|---|---|
| EP | 1 944 806 A2 | 7/2008 |
| EP | 2333644 A2 | 6/2011 |

(Continued)

OTHER PUBLICATIONS

EPO Search Report dated Nov. 28, 2014, for corresponding European Patent application 14189283.6, (7 pages).

(Continued)

*Primary Examiner* — Kumar Patel
*Assistant Examiner* — Sejoon Ahn
(74) *Attorney, Agent, or Firm* — Lewis Roca Rothgerber Christie LLP

(57) ABSTRACT

A display device includes a pixel array comprising a plurality of pixels, each of the pixels comprising a plurality of sub-pixels; a black matrix located between the sub-pixels; and an optical sensing array at the black matrix, the optical sensing array comprising a row conductor, and a column conductor that crosses the row conductor at a crossing region.

14 Claims, 12 Drawing Sheets

(56) References Cited

U.S. PATENT DOCUMENTS

| | | | |
|---|---|---|---|
| 2005/0230673 A1* | 10/2005 | Mueller | B82Y 10/00 257/13 |
| 2005/0268962 A1* | 12/2005 | Gaudiana | H01L 25/047 136/255 |
| 2006/0284540 A1* | 12/2006 | Kusunoki | B82Y 10/00 313/311 |
| 2008/0074401 A1 | 3/2008 | Chung et al. | |
| 2008/0150415 A1* | 6/2008 | Kaneeda | B82Y 10/00 313/503 |
| 2008/0158137 A1* | 7/2008 | Yoshida | G09G 3/3413 345/102 |
| 2008/0297487 A1 | 12/2008 | Hotelling et al. | |
| 2009/0146967 A1* | 6/2009 | Ino | G02F 1/133526 345/173 |
| 2009/0146992 A1 | 6/2009 | Fukunaga et al. | |
| 2009/0152664 A1* | 6/2009 | Klem | H01L 27/14603 257/440 |
| 2009/0189878 A1 | 7/2009 | Goertz et al. | |
| 2009/0309821 A1* | 12/2009 | Tanno | G02F 1/133514 345/87 |
| 2009/0315921 A1* | 12/2009 | Sakaigawa | G09G 3/2003 345/694 |
| 2010/0079088 A1* | 4/2010 | Lipcsei | H05B 33/0815 315/297 |
| 2010/0207849 A1* | 8/2010 | Cok | G09G 3/2088 345/76 |
| 2010/0207851 A1* | 8/2010 | Cok | G09G 3/3208 345/82 |
| 2010/0207852 A1* | 8/2010 | Cok | G09G 3/20 345/83 |
| 2010/0245270 A1* | 9/2010 | Nako | G06F 1/1626 345/173 |
| 2010/0253660 A1* | 10/2010 | Hashimoto | G01J 1/02 345/207 |
| 2011/0018893 A1 | 1/2011 | Kim et al. | |
| 2011/0032266 A1* | 2/2011 | Harbach | G09G 3/20 345/589 |
| 2011/0069038 A1 | 3/2011 | Fann et al. | |
| 2011/0199350 A1* | 8/2011 | Wilson | G09G 5/02 345/207 |
| 2011/0210956 A1* | 9/2011 | Girdhar | H01L 27/088 345/212 |
| 2011/0227963 A1* | 9/2011 | Su | G09G 3/3208 345/690 |
| 2011/0234536 A1* | 9/2011 | Yeo | G02F 1/13338 345/175 |
| 2012/0320307 A1 | 12/2012 | Aichi et al. | |
| 2013/0069914 A1* | 3/2013 | Chang | G06F 3/0386 345/175 |
| 2013/0240829 A1* | 9/2013 | Kuramachi | H01L 21/02458 257/9 |
| 2013/0257825 A1 | 10/2013 | Thompson | |
| 2014/0354618 A1* | 12/2014 | Shin | G09G 3/3225 345/212 |

FOREIGN PATENT DOCUMENTS

| | | |
|---|---|---|
| FR | 2958426 A1 | 10/2011 |
| JP | 61-242068 | 10/1986 |
| KR | 10-2012-0025923 A | 3/2012 |
| KR | 10-2012-0067250 A | 6/2012 |
| KR | 10-2013-0030045 A | 3/2013 |
| KR | 10-2013-0054463 A | 5/2013 |

OTHER PUBLICATIONS

EPO Search Report dated Mar. 26, 2015, for corresponding European Patent application 14189283.6, (13 pages).

EPO Partial Search Report dated Feb. 13, 2017, for corresponding European Patent Application No. 16194926.8 (9 pages).

EPO Extended Search Report dated Jun. 23, 2017, for corresponding European Patent Application No. 16194926.8 (20 pages).

EPO Office Action dated Jul. 13, 2017, for corresponding European Patent Application No. 14189283.6 (8 pages).

\* cited by examiner

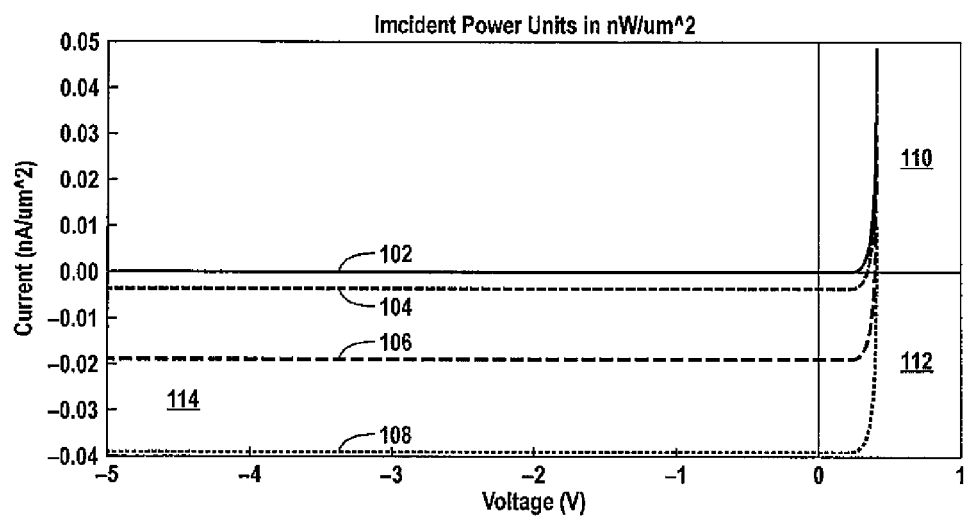
*FIG. 3*
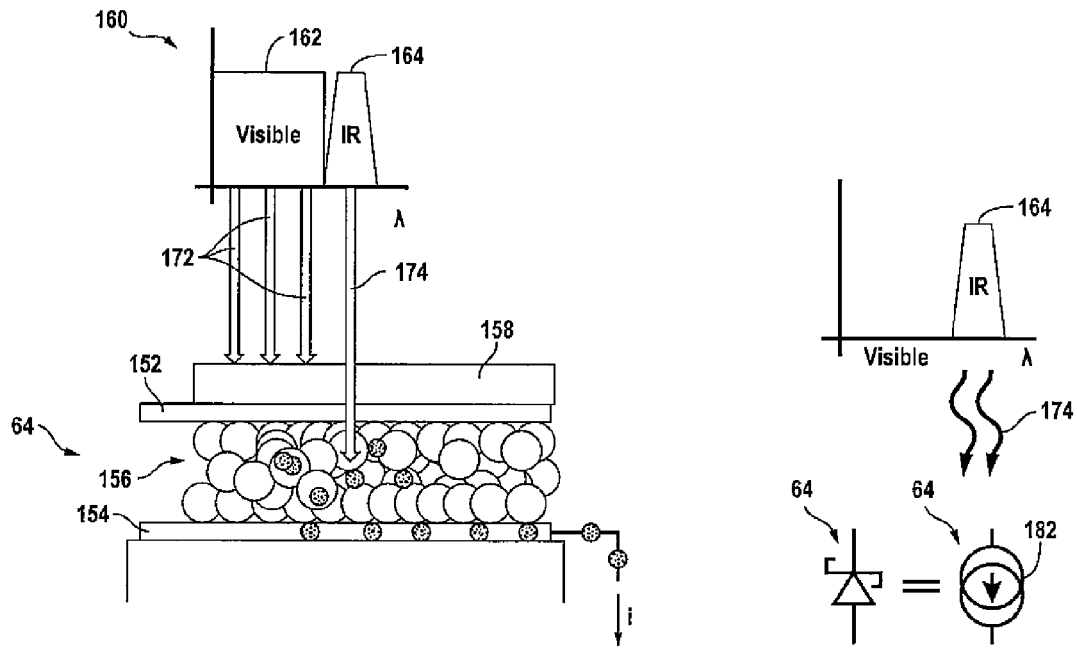
*FIG. 4A*  *FIG. 4B*

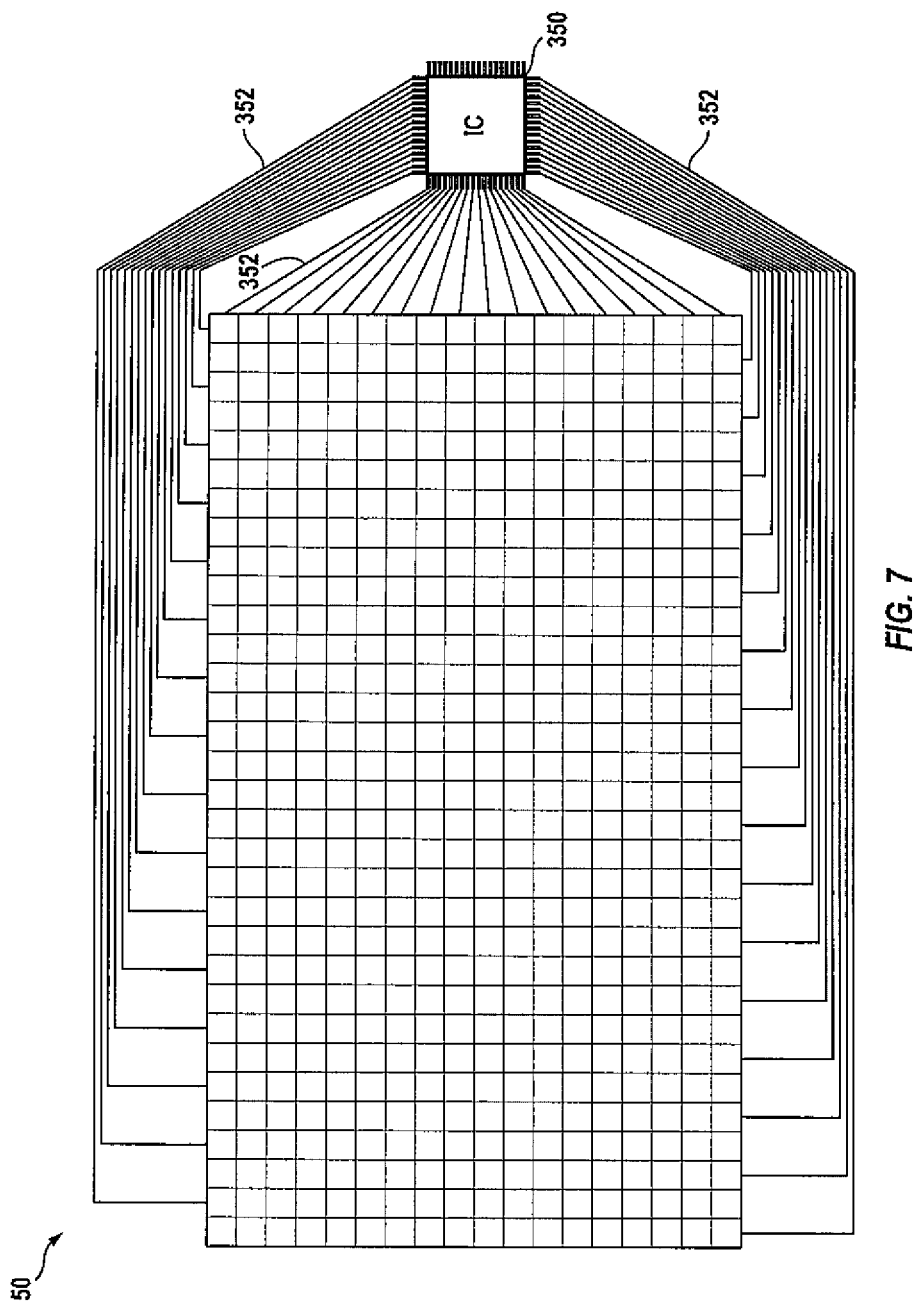

OPTICAL SENSING ARRAY EMBEDDED IN A DISPLAY AND METHOD FOR OPERATING THE ARRAY

CROSS-REFERENCE TO RELATED APPLICATION(S)

This patent application claims the priority to and the benefit of U.S. Provisional Application Ser. No. 61/870,746, filed Aug. 27, 2013, titled "An Optical Sensing Array Embedded in a Display and Method for Operating the Array," the entire content of which is incorporated herein by reference.

BACKGROUND

1. Field

Embodiments of the present invention relate to an optical sensing array embedded in a display and a method for operating the same.

2. Related Art

Display devices have become increasingly popular, and are widely used, such as in cell phones, computer monitors, televisions, tablets, etc. These display devices may be any type of display, including an organic light emitting display (OLED), a liquid crystal display (LCD), etc. In particular, display devices including optical sensors have been developed to, for example, detect a user's interaction with the display device (e.g., an interaction with the display device via the user's finger or via use of a stylus), sense ambient light, scan documents, etc.

However, generally speaking, these embedded optical sensors are manufactured to be formed in the same active area as the display emission elements (e.g., at pixels of a pixel area of a display device). Accordingly, the aperture of the optical sensors (i.e., the portion of display area involved in light sensing) is formed at the expense of the display active area that produces, reflects, and/or transmits light to generate images to be seen by the user of the display device. Consequently, it has been difficult to achieve a sufficiently large optical sensor aperture to be effective at sensing light, while concurrently achieving a visibly bright and power-efficient display. Furthermore, as higher-resolution displays are developed, this problem is exacerbated because the portion of the display surface not involved in producing the image or sensing light does not scale equally with the portion of the display surface which does. That is, the inactive area portion generally grows proportionally larger as the dots per area is reduced, thereby reducing the active area available for both the optical sensors and the display emission elements.

Additionally, the conventional optical sensors are not wavelength selective, and are therefore responsive to light signals other than only the light signal(s) from the particular sources of sensing interest, such as the light signals included in noise corresponding to ambient light (i.e., ambient light noise). As a result, excessive signal processing and power are used to extract the signals of sensing interest from the ambient light noise.

Moreover, when address lines are shared by the optical sensors and the display elements, the processes of reading of the sensors and writing of the display elements may not occur concurrently, resulting in inefficient processing within the display device. Alternatively, when a display device employs separate address control lines, mechanisms, and signals for the optical sensors and the display elements, the area of the display surface allocated to the dual addressing functions is increased, thereby taking additional active area from the display elements.

Furthermore, display devices employing conventional optical sensors may cause crosstalk between the display emission elements and the optical sensors. That is, light from the display elements may be undesirably sensed by the optical sensors, causing incorrect optical readings and/or increased processing to extract the signals of sensing interest from the ambient light noise, or from the light emitted by the display elements.

SUMMARY

Aspects of embodiments of the present invention are directed toward an optical sensing array embedded in a display device, a method of operating the same, and a method of manufacturing the same.

Embodiments of the present invention provide an optical sensing array that does not share the same active area as display emission elements of a display device, thereby allowing the optical sensors to have a larger area without taking area from the active display elements.

Embodiments of the present invention also provide an optical sensor that is sensitive to a select range of wavelengths of light, thereby decreasing the signal processing power used to extract light of particular sources of sensing interest from the ambient light noise. Additionally, embodiments of the present invention provide an optical sensing array having high quantum efficiency.

Embodiments of the present invention further provide an optical sensing array that is operated independently from the display element addressing lines, thereby allowing the display device to operate more quickly and more efficiently.

According to an embodiment of the present invention, there is provided a display device including: a pixel array comprising a plurality of pixels, each of the pixels comprising a plurality of sub-pixels; a black or inactive part of the display area called the black matrix located between the sub-pixels; and an optical sensing array at the black matrix, the optical sensing array comprising a row conductor, and a column conductor that crosses the row conductor at a crossing region.

The optical sensing array may further include a sensing diode coupled to the row conductor and to the column conductor at the crossing region, wherein the sensing diode is configured to generate current in response to light incident on the sensing diode.

The optical sensing array may further include a blocking diode coupled to the row conductor and to the column conductor at the crossing region, and coupled in series with the sensing diode.

The cathode of the blocking diode may face the cathode of the sensing diode.

The anode of the sensing diode may be coupled to the column conductor.

The anode of the blocking diode may be coupled to the row conductor.

The row conductor may be coupled to a switch that may be configured to couple the blocking diode and the sensing diode coupled to the row conductor to a voltage source, such that the blocking diode is forward biased, and such that the sensing diode is reverse biased.

The sensing diode may be configured to generate current in proportion to light incident on the sensing diode when the row conductor is coupled to the voltage source via the switch.

The column conductor may be coupled to a current sensor, and wherein the current sensor is configured to have negligible electrical resistance.

The current generated by the sensing diode may travel through the current sensor coupled to the sensing diode via the column conductor when the row conductor is coupled to the voltage source via the switch.

The optical sensing array may include one sensing diode and one blocking diode for every four pixels of the pixel array.

The display device may further include a partial spectrum pass filter on the sensing diode, wherein the partial spectrum pass filter is configured to absorb a range of wavelengths of light and thereby block that range of wavelengths from reaching the sensing diode, and is configured to allow a remaining range of wavelengths of light to reach the sensing diode.

The display device may further include a light emission array adjacent the optical sensing array, wherein the light emission array is configured to generate light in the remaining range of wavelengths of light.

The sensing diode may include a quantum-dot film layer.

The optical sensing array may be located within the black matrix.

In another embodiment of the present invention, there is provided a method of manufacturing an optical sensing array on a black matrix of a display device, the method including: forming a partial-spectrum pass filter on the black matrix; forming a transparent electrode on the partial spectrum pass filter; and forming a quantum-dot film on the transparent electrode.

The method may further include forming a metal conductor on the quantum-dot film.

The method may further include: forming a light shield on the partial-spectrum pass filter; and forming an insulator on the transparent electrode, the quantum-dot film, and the light shield.

In yet another embodiment of the present invention, there is provided a method of operating a display device including a black matrix and an optical sensing array located at the black matrix, the method including: applying a voltage across a sensing diode and a blocking diode coupled to the sensing diode, such that the sensing diode is reverse biased, and such that the blocking diode is forward biased; generating a current in response to light incident on the sensing diode; and measuring the generated current using a current sensor.

The method may further include outputting the measured current as information to the display device.

BRIEF DESCRIPTION OF THE DRAWINGS

The above and other aspects of embodiments of the present invention will become more apparent by describing in detail exemplary embodiments thereof with reference to the accompanying drawings, in which:

FIG. 3 illustrates a graphical representation of the operation of the sensing diode shown in FIG. 2 according to an embodiment of the present invention;

FIG. 4A illustrates a cross-sectional view of the sensing diode shown in FIG. 2 taken along the line IV-IV;

FIG. 4B illustrates an operation of the sensing diode shown in FIG. 2 according to an embodiment of the present invention;

FIG. 7 is a schematic representation of an interconnection between an optical sensing array and an integrated circuit according to an embodiment of the present invention;

DETAILED DESCRIPTION

Figure 1:
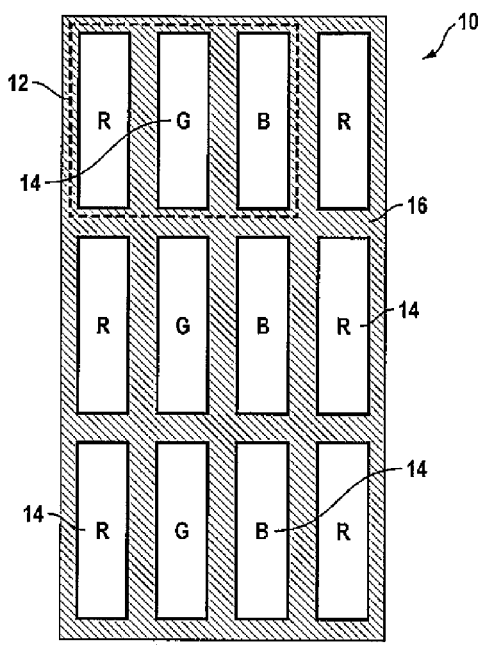
FIG. 1 illustrates a top view of a conventional pixel array of a matrix display device including but not limited to for example an organic light emitting diode matrix or a liquid crystal display matrix.

Hereinafter, embodiments of the present invention will be described more fully with reference to the accompanying drawings, in which, exemplary embodiments of the present invention are shown. As those skilled in the art would realize, the described embodiments are susceptible to various modifications and alternative forms without departing from the spirit or scope of the present invention. For clarity of the description of the present invention, some elements or features not required for the complete understanding of the present invention may be omitted.

The terms used in the present specification are used to describe particular embodiments, and are not intended to limit the present invention. For example, it will be understood that, although the terms "first," "second," etc. may be used herein to describe various elements, these elements would not be limited by the strict construction of these terms. Instead, these terms are used only to distinguish one component from another. Further, an expression used in the singular encompasses the expression of the plural, unless it has a clearly different meaning in the context. In the present specification, it is to be understood that the terms such as "comprising," "including," "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that when an element or layer is referred to as being "on," "connected to," or "coupled to" another element or layer, it can be directly on, connected to, or coupled to the other element or layer, or one or more intervening elements or layers may also be present. Similarly, when an element or layer is referred to as being "connected at" or "coupled at" another element or layer, the element or layer may be directly or indirectly "connected at" or "coupled at" said another element or layer. When an element is referred to as being "directly on," "directly connected to," "directly coupled to," "directly connected at," or "directly coupled at" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the exemplary term "below" may encompass both an orientation of above and below. The device may be otherwise oriented (e.g., rotated 90 degrees or at other orientations) and the spatially relative descriptors used herein should be interpreted accordingly.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Further, when describing embodiments of the present invention, the use of "may" relates to "one or more embodiments of the present invention."

Like reference numerals in the drawings denote like elements, and repeated descriptions thereof may be omitted.

FIG. 1 illustrates a top view of a conventional pixel array of a matrix display.

Referring to FIG. 1, a conventional matrix display device includes a pixel array 10 including pixels 12 that each include sub-pixels 14. The sub-pixels 14 respectively correspond to red (R), green (G), and blue (B) sub-pixel colors. Although the pixels 12 include three sub-pixels 14 each, other conventional display devices may include a different number of sub-pixels per pixel (e.g., 1 or 4), may have a different configuration of sub-pixel colors (e.g., may have a white sub-pixel), and/or may have differently shaped sub-pixels.

The regions surrounding the individual sub-pixels 14 include an inactive black matrix 16. The black matrix 16 may absorb part of the environmental light to reduce reflection and to increase contrast of the display device. Furthermore, address lines for the sub-pixels 14 may reside at regions corresponding to the inactive black matrix 16. According to embodiments of the present invention, an optical sensing array is formed over or within the black matrix 16, either in whole or in part such that the optical sensors do not need to be formed in the active area (e.g., at the sub-pixels 14), as seen in conventional optical sensing display devices. Accordingly, by forming the optical sensing array at the black matrix 16, the optical sensors need not compete for space with the sub-pixels 14, while allowing the aperture of the optical sensors to be suitably large to adequately sense light.

Figure 2A:
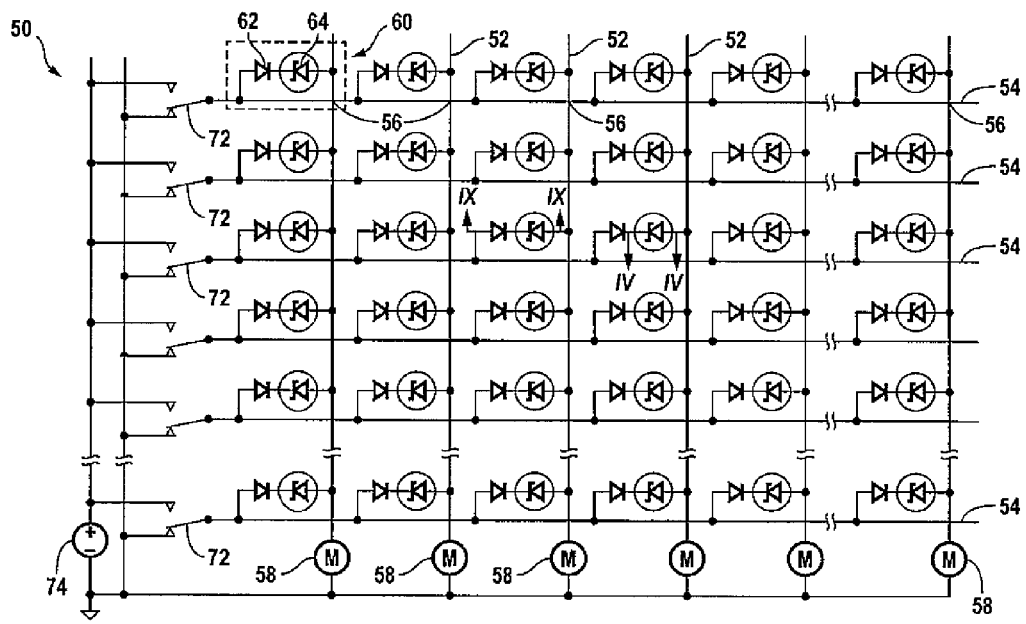
FIG. 2A is a schematic representation of an optical sensing array according to an embodiment of the present invention.
Figure 2B:
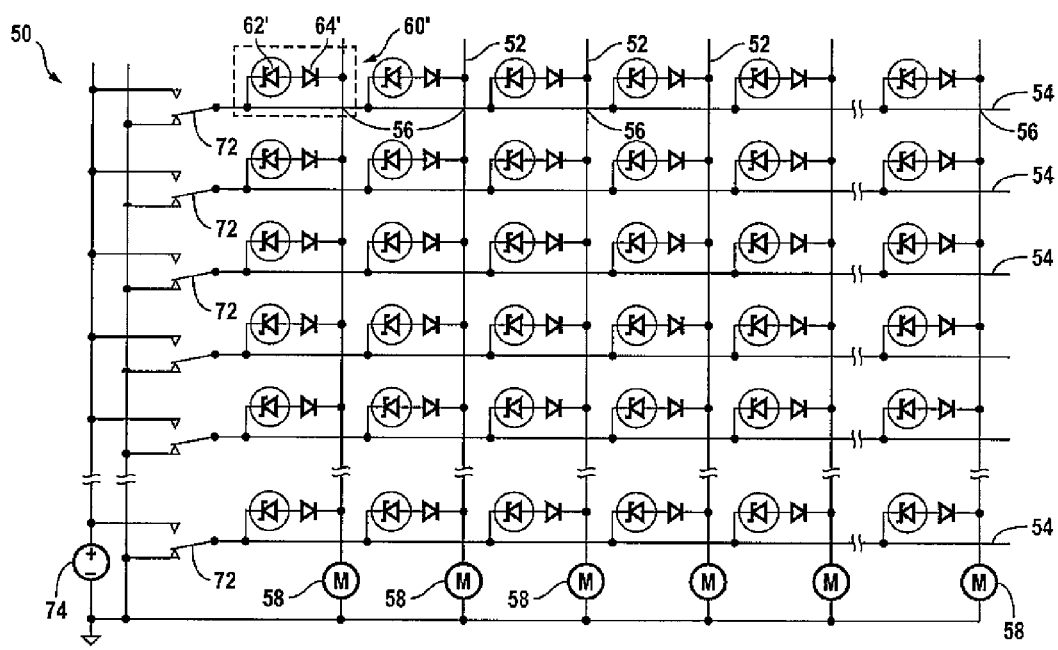
FIG. 2B is a schematic representation of an optical sensing array according to another embodiment of the present invention.
Figure 2C:
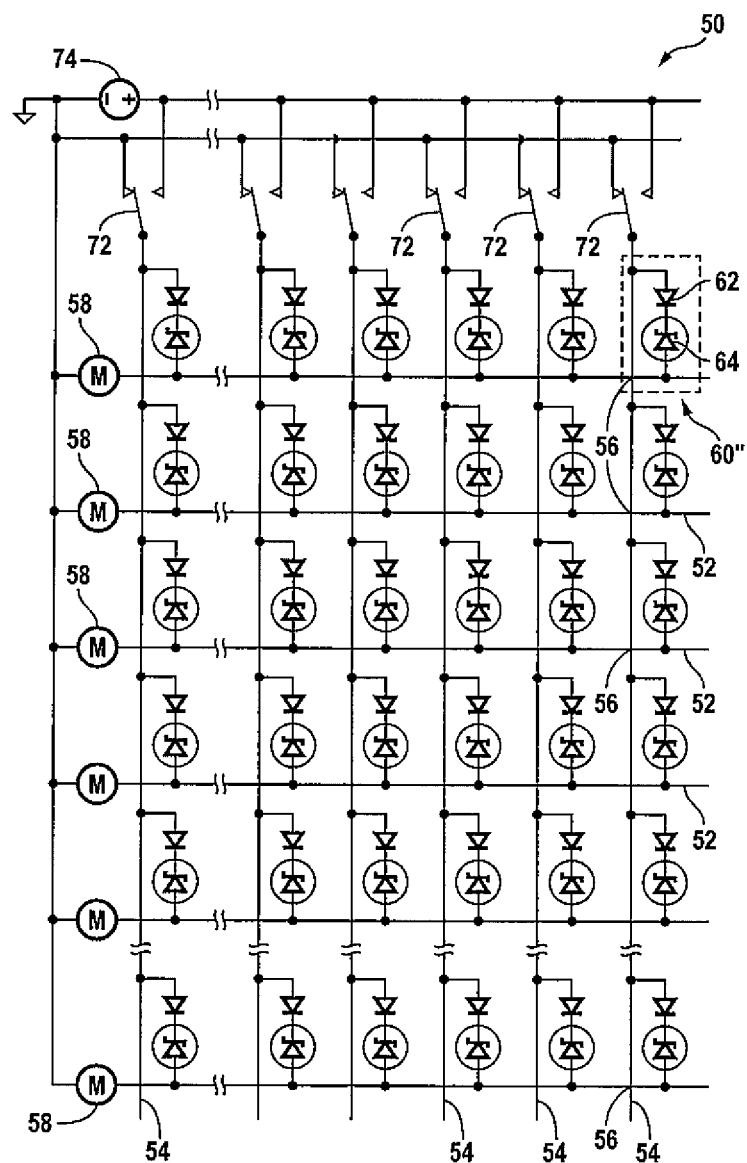
FIG. 2C is a schematic representation of an optical sensing array according to another embodiment of the present invention.

FIGS. 2A, 2B, and 2C are schematic representations of an optical sensing array according to embodiments of the present invention.

Referring to FIG. 2A, the optical sensing array 50 may be formed in a black matrix of a display device, or on the black matrix, such that the optical sensing array 50 traces the pattern of the black matrix (e.g., the optical sensing array 50 may be on a top glass over the black matrix, or may be on a bottom glass under the black matrix).

The optical sensing array 50 includes column conductors 52 and row conductors 54. At each of the crossings 56 of the column conductors 52 and the row conductors 54, the optical sensing array 50 includes an optical sensing unit 60. There may be an insulation layer between the column conductors 52 and the row conductors 54 at each of the crossings 56.

At an end of each of the column conductors 52, the optical sensing array 50 includes current sensors 58. More detail regarding the current sensors 58 is described below. Additionally, an end of each of the row conductors 54 includes a switch 72. The switches 72, when toggled to be in an on state, couple the optical sensing units 60 of a selected conductor row 54 to a voltage source 74. More detail regarding this operation is described below.

According to the present embodiment, each of the optical sensing units 60 includes a blocking diode 62 and a sensing diode 64. Each of the blocking diodes 62 and the sensing diodes 64 are coupled between a respective column conductor 52 and a respective row conductor 54 at a respective one of the crossings 56. Further, the blocking diode 62 and the sensing diode 64 face each other, that is, the cathode of the blocking diode 62 is coupled to the cathode of the sensing diode 64. Accordingly, the anode of the blocking diode 62 is coupled to a corresponding row conductor 54, and the anode of the sensing diode 64 is coupled to a corresponding column conductor 64, thereby completing a closed loop that includes the blocking diode 62 and the sensing diode 64 at each crossing 56.

According to the present embodiment, the sensing diode 64 is depicted as a Schottky diode, while the blocking diode 62 is not. However, in other embodiments of the present invention, the blocking and sensing diodes may be other suitable types of diodes.

Further, while the display device is being described herein with reference to rows and columns corresponding to horizontal and vertical directions as shown in the figures, depending on the orientation or rotation of the display device, the references to rows and columns can be interchanged, as illustrated for example in FIG. 2C, and the present invention is not limited to any particular orientation in which rows and columns correspond solely to horizontal and vertical directions, respectively. In addition, depending on the directions in which scan signals and data signals are respectively applied to the display device, the functions of the rows and columns of pixels may also be interchangeable.

Accordingly, because the optical sensing array 50 is located at the black matrix, and is not located at the active region of the display, it can be larger than would be allowable in the conventional approach (e.g., 3 times larger), and can be formed without taking any area from the active pixel area. However, in some embodiments of the present invention, area from the display pixels may also be allocated as additional area for the optical sensor apertures, which may increase sensitivity of the optical sensing array.

The number of column conductors 52 and row conductors 54 may correspond with the number of rows and columns in the display array of the display device (e.g., the number of optical sensing units 60 may equal the number of pixels in the display device). Alternatively, the number of column conductors 52 and row conductors 54 may be less than the number of rows and columns in the display array (e.g., there may be four pixels to every one optical sensing unit 60).

While the present disclosure generally illustrates an optical sensing array in a flat panel display, embodiments of the present invention may be implemented in a bendable and/or flexible display. Furthermore, the optical sensing array may be formed in an OLED, an LCD, or in other types of displays.

Furthermore, the optical sensing unit 60, even when not in an array, may be used for such functions as detecting ambient lighting, detecting the proximity of a warm object (e.g., a human ear), and other functions of a display device.

The optical sensing unit 60 and its address control lines (e.g., column and row conductors 52 and 54) may further appear black, and therefore may absorb visible wavelengths of light.

The address matrix or lines for the display elements of a display device may be located over the same black matrix (or located in the same black matrix) as the optical sensing array 60. However, the addressing lines for the optical sensing array 60 (e.g., column and row conductors 52 and 54) may be operated independently from the address matrix or lines for the display elements, thereby allowing readout frequency of the optical sensing array 60 to be independent from the display refresh frequency (e.g., refresh rate).

FIG. 3 illustrates a graphical representation of the operation of the sensing diode shown in FIG. 2 according to an embodiment of the present invention.

Referring to FIG. 3, the amount and direction of current flowing through the sensing diode 64, with respect to the voltage across the sensing diode 64, is graphically illustrated. The four different curves (i.e., curve 102, curve 104, curve 106, and curve 108) shown on the graph respectively represent increasing intensities of light that is incident on a surface of the sensing diode 64. The intensity of light is in units of lumens per square meter, or units of lux (lx). For example, curve 102 represents darkness (e.g., when there is no incident light), curve 104 represents light at 0.01 lx, curve 106 represents light at 0.05 lx, and curve 108 represents light at 0.1 lx.

In quadrant 110 of the graph of FIG. 3, which corresponds to when the voltage across the sensing diode 64 is positive (i.e., when the voltage of the anode of the sensing diode 64 is positive with respect to the voltage of the cathode of the sensing diode 64), the sensing diode 64 operates under normal conditions. That is, a current flows from the anode to the cathode of the sensing diode 64, resulting in the flow of positive current through the diode 64.

In quadrant 112, the sensing diode 64 operates in a photovoltaic mode. Quadrant 112 illustrates the operation of solar cells.

In quadrant 114, the cathode of the sensing diode 64 is driven positive with respect to its anode (i.e., the voltage of the cathode of the sensing diode 64 is higher than the voltage of the anode of the sensing diode 64). Accordingly, the voltage across the sensing diode 64 is negative, resulting in the sensing diode 64 being reverse biased. In quadrant 114, the sensing diode 64 operates in a photoconductive mode, and functions as a light-dependent current source in which a constant current flows from the cathode to the anode of the sensing diode 64 independent of the negative voltage across the sensing diode 64.

For example, with respect to quadrant 114, when observing behavior of the sensing diode 64 when there is no light incident thereon, the dark curve 102 indicates that the sensing diode 64 generates no current at any negative voltage level. However, as illustrated by curve 104, in response to a light illumination of 0.01 lx, the sensing diode 64 generates a small amount of current (approximately $-0.04$ nA/μm$^2$). The higher the light illumination at the sensing diode 64, the more current the diode 64 generates when reverse biased, as illustrated by curves 106 and 108 with light intensities of 0.05 lx and 0.1 lx corresponding to currents of approximately $-0.019$ nA/μm$^2$ and $-0.039$ nA/μm$^2$, respectively.

FIG. 4A illustrates a cross-sectional view of the sensing diode shown in FIG. 2 taken along the line IV-IV.

Referring to FIG. 4A, the sensing diode 64 includes a transparent electrode (or transparent conductor) 152, conductor (or electrode) 154, and quantum dots (or a quantum dot film) 156 interposed between the transparent electrode 152 and the conductor 154. The transparent electrode 152 allows light to pass through to the quantum dots 156. The conductor 154 may be made from metal.

The quantum dots 156 conduct electrons (i.e., electrical current) when photons (i.e., light) are incident on the sensing diode 64 when the sensing diode 64 is reverse biased, as discussed above with respect to FIG. 3. The current that is generated by the quantum dots 156 travel through the conductor 154 to other components of the display device (e.g., to an integrated circuit configured to monitor the light-generated current so that the display device may appropriately utilize this information).

Over the optical sensing array 50 (as shown in FIG. 2), there may be a light filter layer (e.g., a partial spectrum pass filter) 158 (shown in FIG. 4A). The light filter layer 158 may be configured to block certain wavelengths of light (e.g., predetermined wavelengths of light) from reaching the sensing diode 64 (e.g., from reaching the quantum dots 156). In other words, the light filter layer 158 allows certain wavelengths of light to reach the sensing diode 64, while blocking other wavelengths of light.

Light spectrum 160 illustrates ranges of wavelength (y) for visible light 162 and for infrared light 164, which correspond to visible light rays 172 and infrared light rays 174, respectively. The wavelength band for visible light is about 390 nm to about 700 nm, and the wavelength band for infrared light is about 700 nm to about 1000 nm although a more narrow band within this infrared light range is ordinarily useful.

In the embodiment of the present invention shown in FIG. 4A, the light filter layer 158 is configured to block visible light rays 172, while allowing infrared light rays 174 to pass to the sensing diode 64. Accordingly, in the present embodiment, the quantum dots 156 of the sensing diode 64 generate charge carriers (e.g., electrons) in response to incident infrared light 174, while the light filter layer 158 blocks the visible light to prevent the quantum dots 156 of the sensing diode 64 from generating charge carriers in response to visible light.

The combination of the light filter layer 158 that cuts off (e.g., absorbs) visible light 172 and passes infrared light 174, and the quantum dots 156 that are responsive to the wavelengths of infrared light 174, which are longer than those of visible light 172, collectively produce a narrow wavelength band detector that decreases wasteful signal processing power used to extract a signal of sensing interest from ambient light noise.

In the present embodiment, the quantum dots 156 may exhibit a quantum efficiency of about 80% in the infrared range, while conventional optical sensors exhibit 50% or less quantum efficiency for infrared light. Furthermore, for the same thickness as that of, for example, amorphous silicon, the quantum dots 156 may be about 100 times more effective at converting photons to electrons than the amorphous silicon, which are used in conventional optical sensors.

Because the sensing diode 64 is band-limited to a wavelength band outside of the visible display light range, cross-talk between the display and the optical sensing array may be decreased. Furthermore, in other embodiments, even if the sensor is designed to be sensitive to visible display light, the display device may further include a light blocking layer to decrease cross-talk.

Although the present embodiment includes a light filter layer 158 that is configured to block visible light and to allow infrared light, other embodiments of the present invention may include a light filter layer that blocks or allows different wavelength bands of light to reach the sensing diode. For example, embodiments of the present invention may include a light filter layer that allows visible light, that allows specific wavelengths of light, that allows a narrow band within the infrared band, or that allows any other desired wavelength band or combinations of wavelength bands, to reach the sensing diode. The wavelength bands to which the sensing diode 64 is sensitive may be determined by design of the light filter layer 158 in combination with design of the quantum dots 156 (e.g., adjustment of the size of the quantum dots 156).

In other embodiments of the present invention, the sensing diode 64 may include materials other than the quantum dots 156. For example, the sensing diode 64 may include amorphous silicon or polycrystalline silicon, or variations thereof.

In some embodiments of the present invention, the optical sensing array, which is located with (e.g., adjacent to) the display emission sources, may also be located with an array of light emission sources. The light emission array may emit light with a wavelength in the sensitivity band of the optical sensing array, and therefore may be utilized to illuminate objects for sensing by the optical sensing array.

FIG. 4B illustrates an operation of the sensing diode shown in FIG. 2 according to an embodiment of the present invention.

The sensing diode 64 is configured to function as a light-dependent current source when reverse biased, as described above. Referring to FIG. 4B, as the visible light 172 is blocked by the light filter layer 158, and when the infrared light 174 is incident on the sensing diode 64, the sensing diode 64 generates negative current 182 (i.e., current that travels from the cathode to the anode of the sensing diode 64 when the sensing diode 64 is reverse biased (i.e., the voltage across the diode is more positive from cathode to anode).

Figure 5:
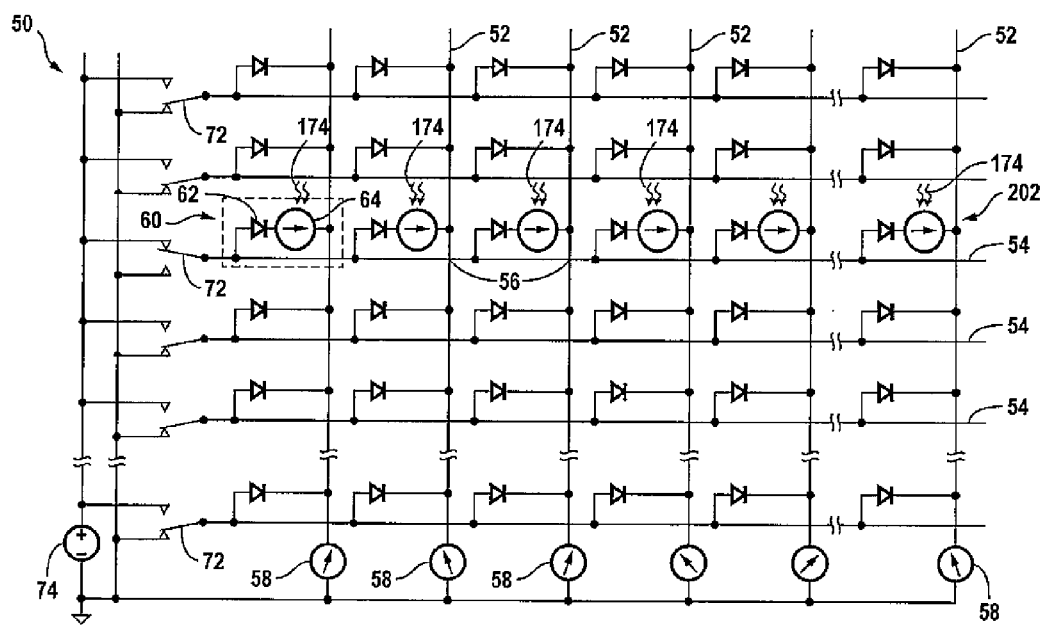
FIG. 5 is a schematic representation of the optical sensing array shown in FIG. 2, when a row of the optical sensing array is coupled to a voltage source, according to an embodiment of the present invention.

FIG. 5 is a functional schematic representation of the optical sensing array shown in FIG. 2 when a row of the optical sensing array is coupled to a voltage source, according to an embodiment of the present invention.

Referring to FIG. 5, all but the active row conductor 202 (i.e., the third row conductor 54 from the top of the optical sensing array 50) is maintained at zero volts. The active row conductor 202 is selected by toggling "on" the switch 72 coupled to the active row conductor 202. When the switch 72 coupled to the active row conductor 202 is on, the voltage source 74 is supplied to the active row conductor 202, and the active row conductor 202 is biased to a positive voltage.

Consequently, because of the positive voltage applied to the active row conductor 202, each of the sensing diodes 64 of the active row conductor 202 becomes reverse biased. Accordingly, each of the sensing diodes 64 of the active row conductor 202 is configured to generate current in proportion to the light incident on each of the sensing diodes 64 in the active row conductor 202. According to the current embodiment of the present invention, as the infrared light 174 is incident on a sensing diode 64 of the active row conductor 202, current is generated in a direction away from the blocking diode 62, as depicted by the arrow corresponding to the sensing diodes 64.

Furthermore, the blocking diode 62 is forward biased when the active row conductor 202 is coupled to the voltage source 74 via the switch 72. As such, the blocking diode 62 decreases current originating from the optical sensing units 60 of the active row conductor 202 from leaking into other column conductors 52. In other words, a corresponding blocking diode 62 ensures that current transmitted down a corresponding column conductor 52 originates from its corresponding sensing diode 64, and that current originating from neighboring sensing diodes 64 are not included. It will be understood, by those skilled in the art, that the order of the blocking diode 62 and sensing diode 64 can be reversed without altering the operation of the circuit provided that the sense of each diode is not changed. Referring to FIG. 2B, the cathode of blocking diode 62' may be connected to the column line and the cathode of the sensing diode 64' (shown as a Schottky diode in FIG. 2B) may be connected to the row line, as shown. Also, each of the blocking diode and the sensing diode may respectively be a Schottky diode or any other suitable diode.

The current generated by the sensing diode 64 travels from the sensing diodes 64, down respective column conductors 52, and through respective current sensors 58 coupled to the respective column conductors 52. The current sensors 58 may be configured to measure the sensing diode-generated current independent of voltage drops, as they may function as electrical shorts.

According to embodiments of the present invention, the current sensors are coupled to components of the display device that read the content of the array to obtain a signal responsive to the intensity of the light impinging on each sensor, in response to the current that travels through the current sensors 58. These reading components may be any circuitry known to those having ordinary skill in the art, such as an integrated circuit.

Figure 6A:
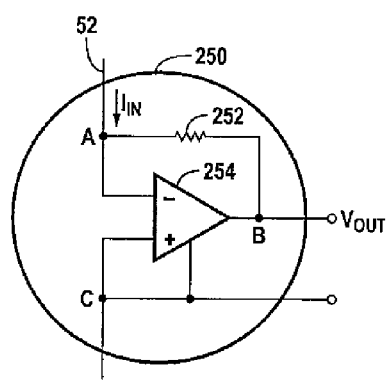
FIG. 6A is a schematic representation of the current sensor shown in FIG. 5 according to an embodiment of the present invention.

FIG. 6A is a schematic representation of the current sensors shown in FIG. 5, according to an embodiment of the present invention.

Referring to FIG. 6A, current sensor 250 includes resistor 252 and inverting operational amplifier 254. An input current $I_{IN}$, which is a current generated from a reverse biased sensing diode 64 in response to incident light, travels down a corresponding column conductor 52 that is coupled to the current generating sensing diode 64. The current $I_{IN}$ enters the current sensor 250 coupled to the corresponding column conductor 52.

According to the present embodiment, in the current sensor 250, the current $I_{IN}$ travels through the resistor 252. The effective resistance between the top and bottom terminals (e.g., the effective resistance between node A and node C) is virtually 0Ω, as the operational amplifier 254 maintains node A and node C at virtually the same voltage level. As such, in the present embodiment, since terminal C is connected to ground, terminal A is effectively also ground potential.

Accordingly, the output voltage $V_{OUT}$ at node B is proportional to the current generated from the sensing diode 64. In particular, the output voltage $V_{OUT}$ may be represented by the following equation:

$$V_{OUT} = -R \ast I_{IN}$$

In the above equation, $V_{OUT}$ is the output voltage of the inverting operational amplifier 254 (e.g., the voltage at node B), R is the resistance of resistor 252, and $I_{IN}$ is the current generated from the sensing diode 64 in response to the incident light. The generated current travels down the corresponding column conductor 52, and is input into the current sensor 250. As such, the current sensor 250 functions as an effective electrical short and the current $I_{IN}$ may be accurately sensed.

Figure 6B:
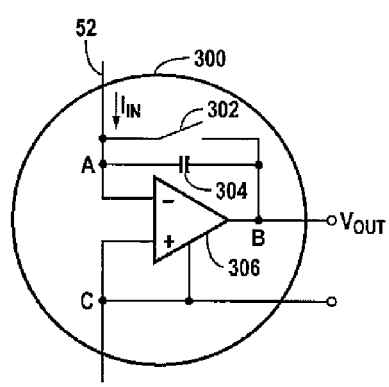
FIG. 6B is a schematic representation of the current sensor shown in FIG. 5 according to another embodiment of the present invention.

FIG. 6B is a schematic representation of the current sensor shown in FIG. 5 according to another embodiment of the present invention.

Referring to FIG. 6B, current sensor 300 includes switch 302, capacitor 304, and inverting operational amplifier 306. An input current $I_{IN}$, which is a current generated from a reverse biased sensing diode 64 in response to incident light, travels down a corresponding column conductor 52 that is coupled to the current generating sensing diode 64. The current $I_{IN}$ enters the current sensor 300 coupled to the corresponding column conductor 52.

As in the embodiment described above in connection with FIG. 6A, the effective resistance between the top and bottom terminals (e.g., the effective resistance between node A and node C) is 0Ω. The current $I_{IN}$ travels through the capacitor 304, and the switch 302 may be used to reset the capacitor 304. As such, the output voltage $V_{OUT}$ at node B corresponds to the following equation:

$$V_{OUT} = -1/C \ast \int i dt$$

In the above equation, $V_{OUT}$ is the output voltage of the inverting operational amplifier 306 (e.g., the voltage at node B), C is the capacitance of the capacitor 304, and $I_{IN}$ is the current generated from the sensing diode 64 in response to the incident light, wherein $I_{IN}$ travels down the corresponding column conductor 52, and is input into the current sensor 300. As such, the current sensor 300 functions as an electrical short, while the current $I_{IN}$ may be accurately sensed. Furthermore, according to the present embodiment, the use of the capacitor may also filter the signal (e.g., if the current $I_{IN}$ is varying, an average of the current may be measured).

Although two embodiments of a current sensor have been described, other current sensors for sensing $I_{IN}$ may be used in other embodiments of the present invention, while providing a limited change in potential of the column line so as to not adversely affect the biasing of the sense diode 64 and thereby significantly changing the current being sensed.

FIG. 7 is a schematic representation of an interconnection between an optical sensing array and an integrated circuit, according to an embodiment of the present invention.

Referring to FIG. 7, one implementation of supplying the control signals to the optical sensing array 50 is to couple the optical sensing array 50 to an integrated circuit (IC) 350, which may generate the control signals (e.g., signals that control which conductor row or rows of the optical sensing array is selected for sensing and which column or columns are used to sense the current produced whether or not light is incident on the sensing diodes coupled to the conductor row). The row conductors may be selected or addressed sequentially. In the present embodiment, the rows and columns of the optical sensing array 50 are coupled to the integrated circuit 350 by wiring 352.

In other embodiments of the present invention, the rows and columns of the optical sensing array 50 are separated into a bank of row integrated circuits and a bank of column integrated circuits, similar to the configuration of the address control of a flat panel display. That is, the row lines may be grouped into sets. For example, one set may be, the first 256 row lines and a second set may be the next 256 row lines and so on. Each row line of a particular grouped set may be connected to and controlled by a row integrated circuit and there may be one or more such pairings of a row integrated circuit to service a set of row lines. Likewise, the column lines may be grouped into sets. Each column line of a set may be connected to and sensed by a column integrated circuit and there may be one or more such pairings of a column integrated circuit to service a set of column lines.

Figure 8:
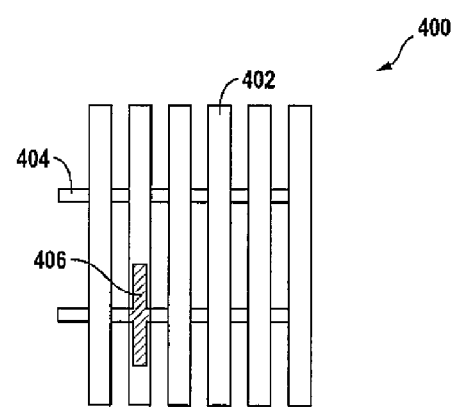
FIG. 8 illustrates a top view of rows and columns of an optical sensing array according to an embodiment of the present invention.

FIG. 8 illustrates a top view of rows and columns of an optical sensing array according to an embodiment of the present invention.

Referring to FIG. 8, optical sensing array 400 includes columns 402 and rows 404. The columns 402 may include layers of a visible light filter and an electrode. The rows 404 may include layers of a visible light filter, a transparent electrode, and a quantum dot film therebetween (e.g., see FIG. 4A). According to embodiments of the present invention, the columns 402 and the rows 404 of the optical sensing array 400 are located at a black matrix of a display device, which may be located between sub-pixels of the display device.

At crossings of the columns 402 and the rows 404, the column includes an elongated portion 406. It is at these elongated portions where a blocking diode and a sensing diode may be located.

Figure 9:
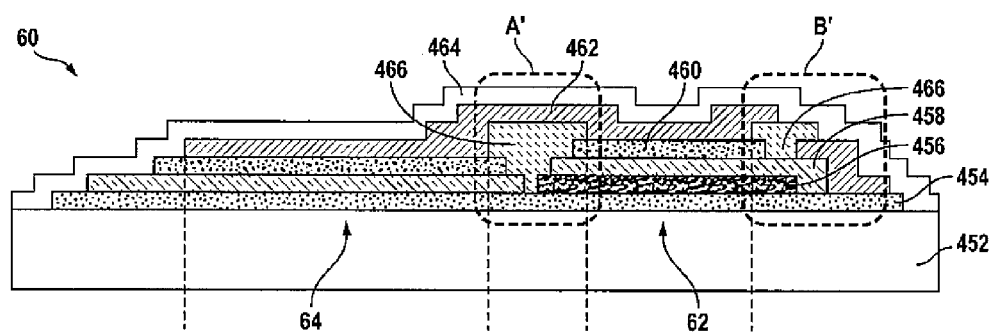
FIG. 9 illustrates a cross-sectional view of a blocking diode and a sensing diode of the optical sensing array shown in FIG. 2 taken along the line IX-IX.

FIG. 9 illustrates a cross-sectional view of a blocking diode and a sensing diode of the optical sensing array shown in FIG. 2 taken along the line IX-IX.

Referring to FIG. 9, a display device with an optical sensing array includes a front glass substrate 452, on which the optical sensing array is formed, and through which environment light is directed. However, in other embodiments, the optical sensing array may not be formed on the front glass substrate 452, but may be formed on a back substrate, for example. FIG. 9 further illustrates the regions of the cross-sectional view that correspond to the blocking diode 62 and the sensing diode 64.

In the present embodiment, the optical sensing array includes a partial spectrum pass filter 454. The partial spectrum pass filter 454 may be configured to block visible light, and may be configured to allow infrared light to pass to the sensing diode 64, as described above. A light shield 456 is formed on the partial spectrum pass filter 454. The light shield 454 may reduce ambient light noise from impinging on the sensing diode 64. A transparent conductor or transparent electrode 458 is formed on the light shield 456 at the blocking diode 62, and is formed on the partial spectrum pass filter 454 at the sensing diode 64. The transparent conductor 458 allows the filtered light from the partial spectrum pass filter 454 to pass, and may be formed of indium tin oxide (ITO), or any other suitable transparent conductive material.

A quantum dot film 460 is formed on the transparent conductor 458. On the quantum dot film 460, a metal conductor 462 is formed. The metal conductor 462 may be a low work-function metal conductor. The metal conductor 462 may function as the row conductor 54 shown in FIG. 2. Additionally, a barrier coating 464 is formed on the metal conductor 462, and is formed over substantially the entire optical sensing array.

Furthermore, an insulator 466 is below the metal conductor 462. The insulator 466 may be made from silicon oxide ($SiO_2$), or from any other suitable insulating material. The insulator 466 separates and insulates the transparent conductor 458 and quantum dot film 460 of the sensing diode 64 from the light shield 456, the transparent conductor 458, and the quantum dot film 460 of the blocking diode 62. Moreover, the insulation layer 466 separates and insulates the quantum dot film 460 from the metal conductor (e.g., the row conductor) 462.

The blocking diode 62 may be manufactured as any suitable diode for performing the functions described above, as known by a person having ordinary skill in the art.

FIGS. 10A, 10B, 10C, 10D, 10E, 10F, and 10G illustrate a method of manufacturing an optical sensing array according to embodiments of the present invention.

Figure 10A:
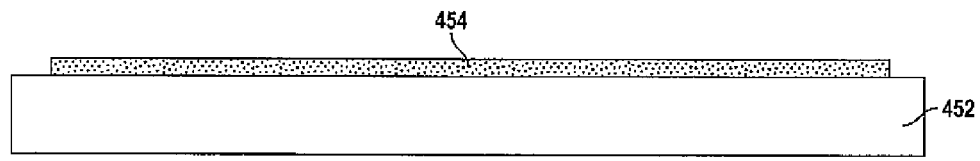
FIGS. 10A, 10B, 10C, 10D, 10E, 10F, and 10G illustrate a method of manufacturing an optical sensing array according to embodiments of the present invention.

Referring to FIG. 10A, the manufacturing process begins by forming the partial spectrum pass filter 454 on the glass substrate 452 of the display device 450. The partial spectrum pass filter 454 may then be patterned to trace the pattern of a black matrix of the display device 450.

Figure 10B:
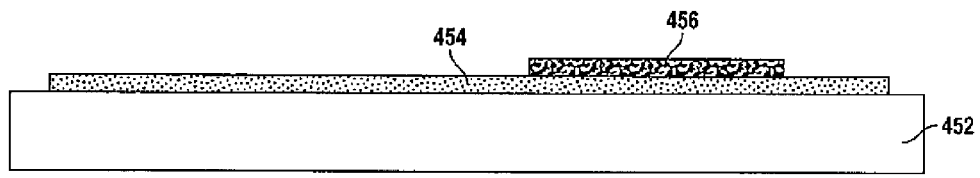

Referring to FIG. 10B, the light shield 456 is formed on the partial spectrum pass filter 454. The partial spectrum pass filter 454 is formed at the blocking diode 62 of the optical sensing unit 60. Alternatively, the light shield 456 may be formed along the partial spectrum pass filter 454, and may be then patterned to be located at each blocking diode 62 of the optical sensing array.

Figure 10C:
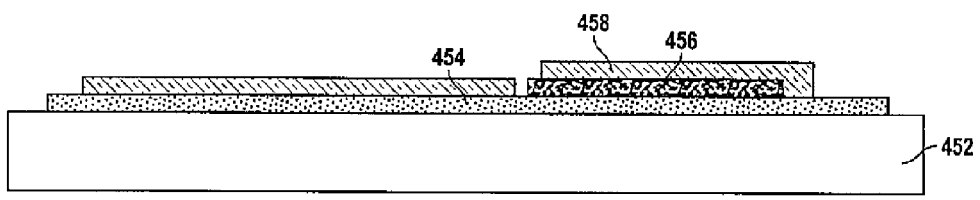

Referring to FIG. 10C, the transparent conductor 458 is formed on the light shield 456 at the blocking diode 62, and is formed on the partial spectrum pass filter 454 at the sensing diode 64. The transparent conductor 458 is also patterned such that it is separated at a location between the blocking diode 62 and the sensing diode 64. Furthermore, the transparent conductor 458 is patterned to encompass the light shield 456 and to not extend beyond the light shield 456. Accordingly, the transparent conductor 458 is segmented into two separate regions, one associated with the sensing diode 64 and another associated with the blocking diode 62.

Figure 10D:
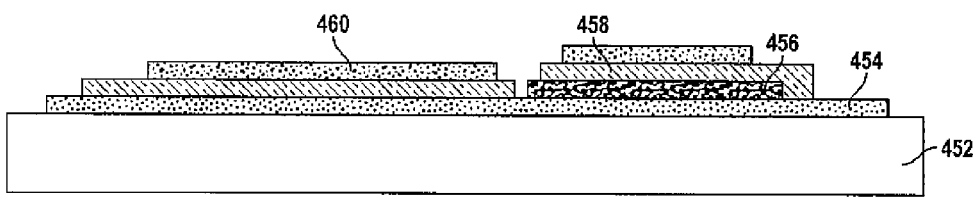

Referring to FIG. 10D, the quantum dot film 460 is formed and patterned over the transparent conductor 458. The quantum dot film 460 is patterned to be separated at a location between the sensing diode 64 and the blocking diode 62. Furthermore, each segment of the quantum dot film 460 is patterned to have a length that is narrower than a respective segment of the transparent conductor 458 on which the respective segments of the quantum dot film 460 are formed.

Figure 10E:
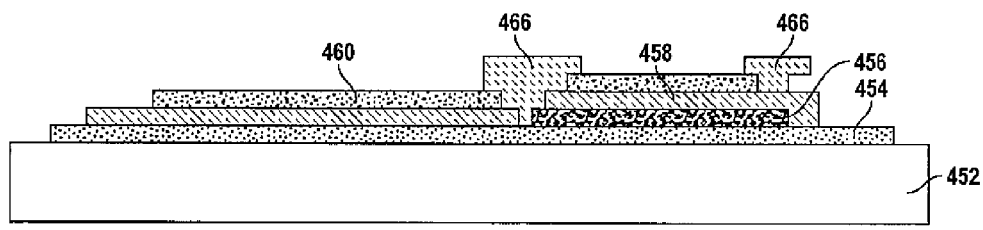

Referring to FIG. 10E, the empty space between the sensing diode 64 and the blocking diode 62, and the empty space at the end of the blocking diode 62 (e.g., where the row conductor meets the blocking diode 62) is filled with an insulating material to form insulator 466. The insulating material may be $SiO_2$, or may be any other suitable insulating material.

Figure 10F:
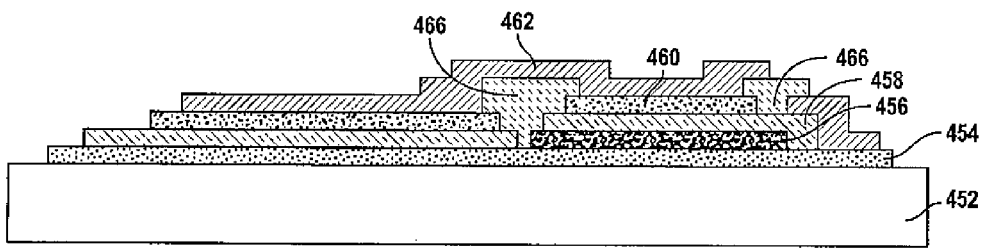
Figure 10G:
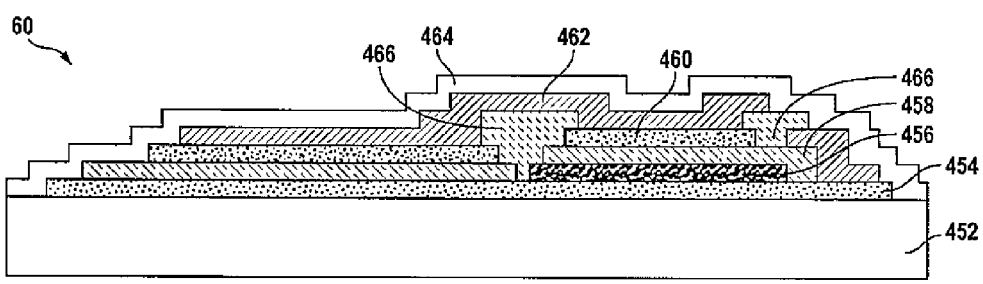

Referring to FIG. 10F, the metal conductor 462 is formed on the quantum dot film 460 and on the insulation material 466. The metal conductor 462 couples the blocking diode 62 and the sensing diode 64 together. The metal conductor 462 functions also as the row conductor 54, as shown in FIG. 2. The metal conductor 462 may be aluminum, or may be any other suitable metal conductor. Referring to FIG. 10G, the barrier coating 464 is formed on the metal conductor 462 and on the insulator 466.

Figure 11A:
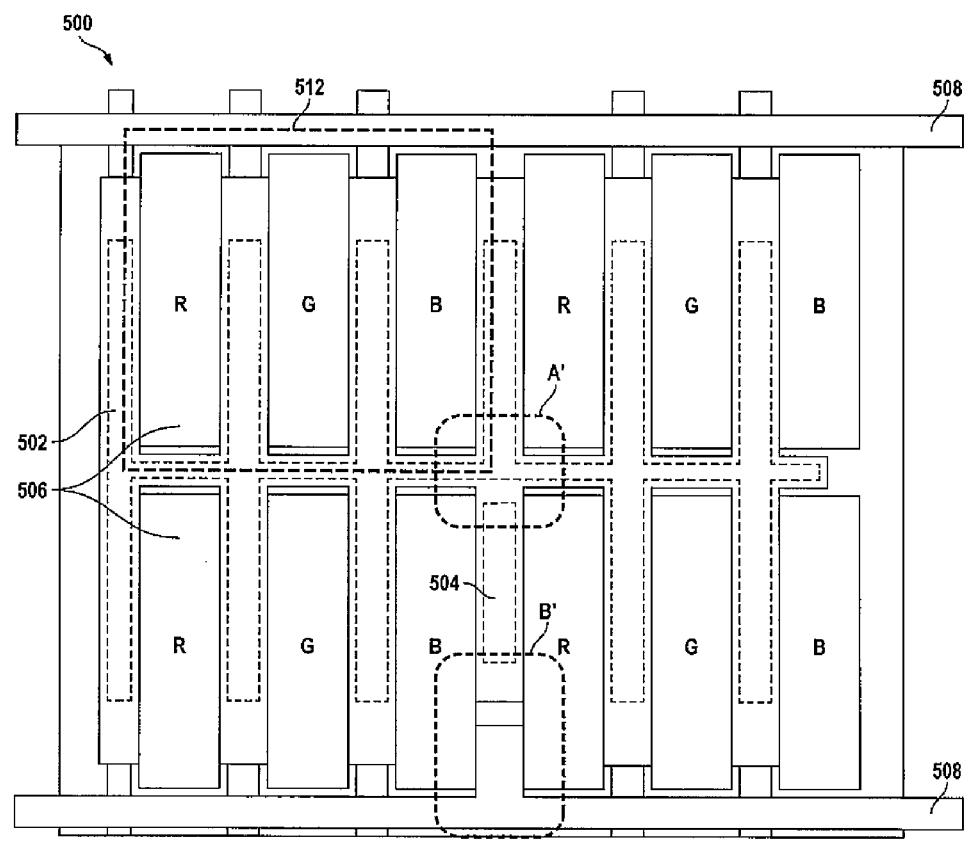
FIG. 11A illustrates a top view of a pixel area of a display device according to an embodiment of the present invention.

FIG. 11A illustrates a top view of a pixel area of a display device according to an embodiment of the present invention.

Referring to FIG. 11A, the pixel area 500 includes sub-pixels 506. In this embodiment, the pixels 512 include red (R), green (G), and blue (B) sub-pixels 506. Furthermore, an optical sensing array is located between the sub-pixels 506 where a black matrix of a display device may be located.

The optical sensing array includes a sensing diode 502, a blocking diode 504, and row conductors 508. In the present embodiment, the sensing diode 502 is located between the sub-pixels 506 of four separate pixels 512. That is, the sensing diode 502 is located at the sub-pixels 506 of the top-left, the top-right, the bottom-left, and the bottom-right pixels 512. Additionally, the blocking diode 504 is located adjacent the sensing diode 502 between the bottom-left and the bottom-right pixels 512. A row conductor 508 is coupled to an end of the blocking diode 504.

The regions labeled A' and B' correspond to those portions labeled the same in FIG. 9. Region A' includes the area of the optical sensing unit where the sensing diode 502 and the blocking diode 504 are coupled to each other at their respective cathodes. FIG. 9 illustrates this coupling via the metal conductor 462. Region B' includes the area where the anode of the blocking diode 504 is coupled to the row conductor 508. As illustrated in FIG. 9, the blocking diode 504 is coupled to the row conductor 508 via the transparent conductor 458 of the blocking diode 504.

Figure 11B:
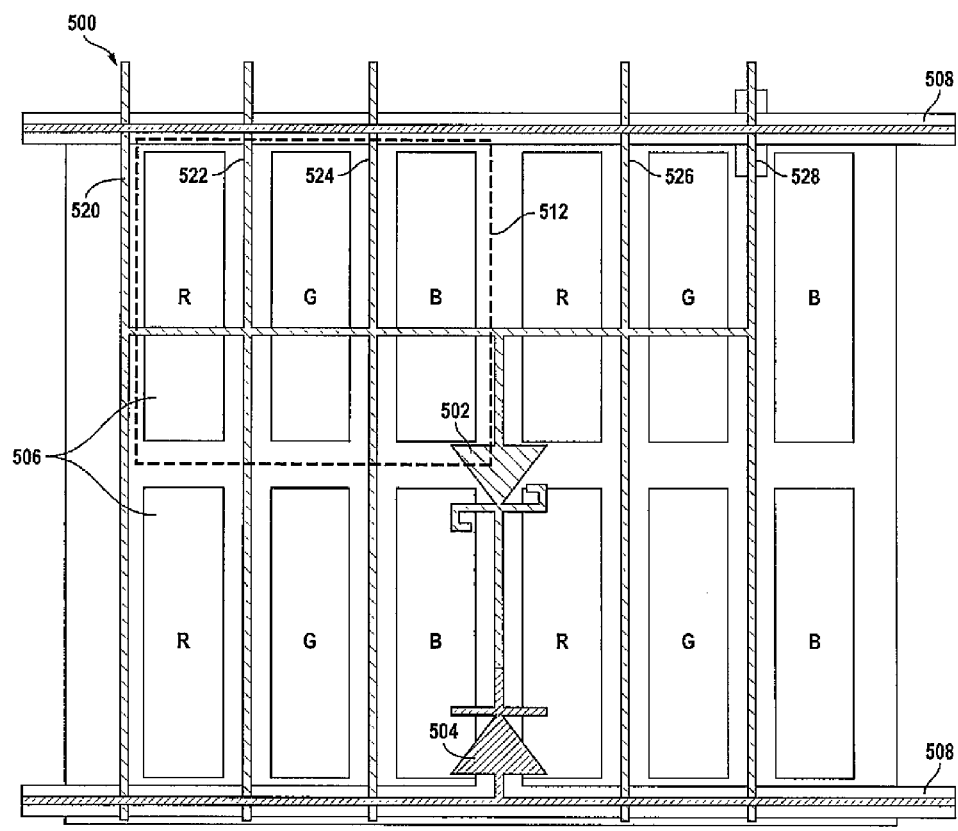
FIG. 11B is a partial schematic representation of the pixel area of the display device shown in FIG. 11A according to an embodiment of the present invention.

FIG. 11B is a partial schematic representation of the pixel area of the display device shown in FIG. 11A according to an embodiment of the present invention.

Referring to FIG. 11B, the components of the pixel area 500 are substantially similar to those of FIG. 11A. FIG. 11B illustrates the locations of the sensing diode 502 and the blocking diode 504 with respect to the pixels 512 of the pixel area 500. The embodiment of the present invention shown in FIGS. 11A and 11B illustrates a one-to-four sensor-to-pixel ratio (i.e., for every four pixels 512, there is one sensing diode 502). In other words, the optical sensing array has a one-fourth display resolution. However, embodiments of the present invention are not limited to this resolution, as any suitable sensor to pixel ratio may be used. For example, more sensors may be added to the optical sensing array (e.g., one sensor per sub-pixel). However, by decreasing the sensor to pixel ratio (e.g., by decreasing the sensor resolution to ¼ the display), the sensitivity of the optical sensing array may be increased and there may be construction advantages originating in having some display row lines not also being used as sensing array row lines.

The anode of the blocking diode 504 is coupled to its corresponding row conductor 508, while the anode of the sensing diode 502 is coupled to its corresponding column conductors that are adjacent the sub-pixels 512. In the present embodiment, because there are four pixels corresponding to one sensor, the sensing diode 502 is coupled to the columns 520, 522, 524, 526, and 528 between the sub-pixels 506 of the four pixels 512 corresponding to the sensing diode 502. Accordingly, the columns 520, 522, 524, 526, and 528, which are coupled to the anode of the sensing diode 502, are electrically shorted to effectively act as a single column conductor of the optical sensing array. Therefore, according to the present embodiment, the columns 520, 522, 524, 526, and 528 are equivalent to one column conductor 52 that is schematically shown in FIG. 2.

According to embodiments of the present invention, an optical sensing array may generate current in accordance with the following equation:

$$I = \text{Irradiance}(\text{photons } s^{-1} m^{-2}) * A(\text{microns}^2) \times 10^{-12} (m^2/\text{microns}^2) * Q.E.(\text{electrons/photon}) * 1.6 \times 10^{-19}(C/\text{electron})$$

In the above equation, the current (I) is a function of irradiance (e.g., the intensity of the light incident on the sensor), the total light collecting area (A) of the sensing diode (e.g., the area of the outlined sensing diode 502 shown in FIG. 11A), and the quantum efficiency of the light sensing array (Q.E.).

According to one embodiment of the present invention, an optical sensing array may be sensitive to infrared light (e.g., light having a wavelength of about 940 nm), and may thus have a quantum efficiency of about 0.8, as previously discussed. Accordingly, the optical sensing array according to the present embodiment may generate current in response to incident infrared light in accordance with the following equation:

$$I = \text{Irradiance} * A \times 10^{-12} * (0.8) * 1.6 \times 10^{-19} = 1.28 \times 10^{-31} * \text{Irradiance} * A$$

Figure 12:
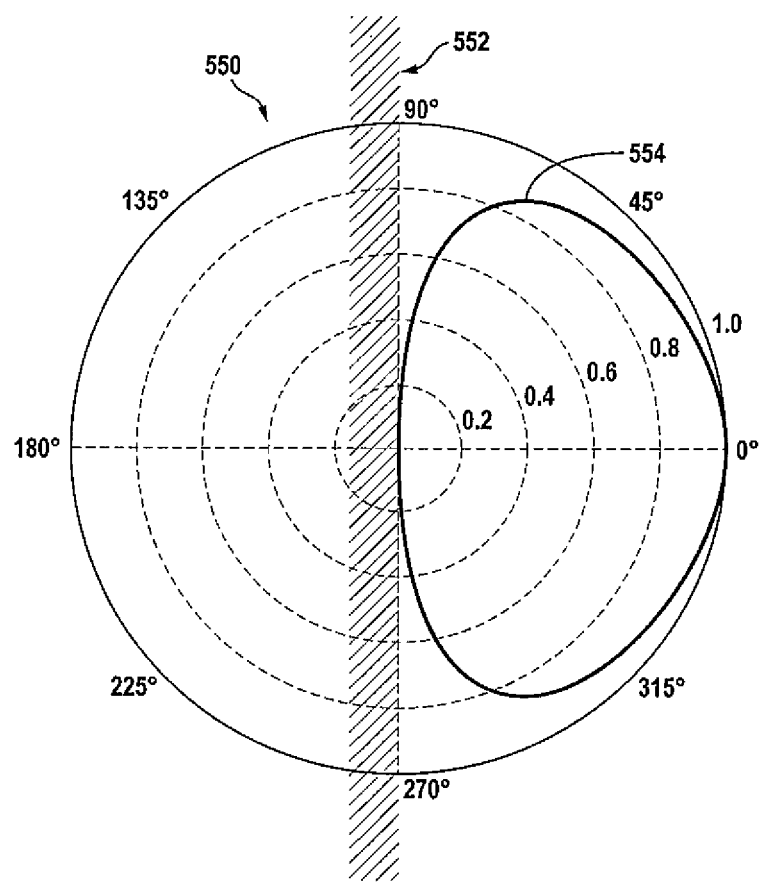
FIG. 12 is a polar graph illustrating a sensitivity of a sensor of an optical sensing array according to an embodiment of the present invention.

FIG. 12 is a polar graph illustrating a sensitivity of a sensor of an optical sensing array according to an embodiment of the present invention.

Referring to FIG. 12, the polar graph 550 illustrates a percentage of absorption of photons incident on a surface 552 of a sensor in relation to different angles of incidence of the photons at the surface 552. According to the graph, at 0°, the photons strike the surface 552 at an angle normal to the surface of the sensor 552, and at 90° and 270°, the graph is parallel to and at the surface 552.

Curve 554 illustrates the behavior of the sensor in response to the impinging photons at the different angles. For example, the sensor is sensitive to (e.g., absorbs) 100% of the photons travelling at 0° (i.e., travelling perpendicular to, toward, and from the front of, the surface 552). Additionally, the sensor absorbs about 60% of the photons travelling at 80°. As such, FIG. 12 illustrates the broad range of sensitivity with respect to angles of impact of photons that optical sensing arrays according to embodiments of the present invention exhibit.

While the present invention has been described in connection with certain example embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device comprising:
   a pixel array comprising a plurality of pixels, each of the pixels comprising a plurality of sub-pixels comprising a first sub-pixel, a second sub-pixel adjacent the first sub-pixel, and a third sub-pixel adjacent the second sub-pixel, each of the sub-pixels having a width along a first direction, the first, second, and third sub-pixels being arranged along the first direction;
   a black matrix located between the sub-pixels, a portion of the black matrix between the first sub-pixel and the second sub-pixel having a width along the first direction smaller than the width of the first sub-pixel; and
   an optical sensing array at the black matrix, the optical sensing array comprising a row conductor, and a column conductor that crosses the row conductor at a crossing region,
   wherein the optical sensing array further comprises a sensing diode coupled to the row conductor and to the column conductor at the crossing region, wherein the sensing diode is configured to generate current in response to light incident on the sensing diode,
   wherein a first portion of the sensing diode is located between the first sub-pixel and the second sub-pixel along a line extending along the first direction between the first sub-pixel, the second sub-pixel, and the third sub-pixel,
   wherein the first portion of the sensing diode has a width along the first direction smaller than the width of the first sub-pixel, and
   wherein a second portion of the sensing diode is located between the second sub-pixel and the third sub-pixel along the line extending along the first direction between the first sub-pixel, the second sub-pixel, and the third sub-pixel.

2. The display device of claim 1, wherein the optical sensing array further comprises a blocking diode coupled to the row conductor and to the column conductor at the crossing region, and coupled in series with the sensing diode.

3. The display device of claim 2, wherein a cathode of the blocking diode faces a cathode of the sensing diode.

4. The display device of claim 3, wherein an anode of the sensing diode is coupled to the column conductor.

5. The display device of claim 3, wherein an anode of the blocking diode is coupled to the row conductor.

6. The display device of claim 5, wherein the row conductor is coupled to a switch that is configured to couple the blocking diode and the sensing diode coupled to the row conductor to a voltage source, such that the blocking diode is forward biased, and such that the sensing diode is reverse biased.

7. The display device of claim 6, wherein the sensing diode is configured to generate current in proportion to light incident on the sensing diode when the row conductor is coupled to the voltage source via the switch.

8. The display device of claim 7, wherein the column conductor is coupled to a current sensor, and wherein the current sensor is configured to have negligible electrical resistance.

9. The display device of claim 8, wherein the current generated by the sensing diode travels through the current sensor coupled to the sensing diode via the column conductor when the row conductor is coupled to the voltage source via the switch.

10. The display device of claim 2, wherein the optical sensing array comprises one sensing diode and one blocking diode for every four pixels of the pixel array.

11. The display device of claim 1, further comprising a partial spectrum pass filter on the sensing diode, wherein the partial spectrum pass filter is configured to block a range of wavelengths of light from reaching the sensing diode, and is configured to allow a remaining range of wavelengths of light to reach the sensing diode.

12. The display device of claim 11, further comprising a light emission array adjacent the optical sensing array, wherein the light emission array is configured to generate the remaining range of wavelengths of light.

13. The display device of claim 1, wherein the sensing diode comprises a quantum dot film layer.

14. The display device of claim 1, wherein the optical sensing array is within the black matrix.

* * * * *